United States Patent [19]
Smith, Jr.

[11] 4,371,788
[45] * Feb. 1, 1983

[54] ENERGY DEVICE POWERED BY THE MOTION OF WATER BENEATH WAVES

[75] Inventor: E. Quimby Smith, Jr., Graeagle, Calif.

[73] Assignee: Q Corporation, Troy, Mich.

[*] Notice: The portion of the term of this patent subsequent to Oct. 9, 1996, has been disclaimed.

[21] Appl. No.: 163,033

[22] Filed: Jun. 26, 1980

Related U.S. Application Data

[63] Continuation-in-part of Ser. No. 56,186, Jul. 13, 1979, which is a continuation-in-part of Ser. No. 861,967, Dec. 19, 1977, Pat. No. 4,170,738.

[51] Int. Cl.³ .............................................. F03B 13/12
[52] U.S. Cl. ...................................... 290/42; 60/499; 60/503; 60/507; 290/53
[58] Field of Search .................. 290/42, 43, 53, 54; 60/398, 499, 502–507; 415/2, 8, 66; 417/100, 330, 332, 333, 337

[56] References Cited

U.S. PATENT DOCUMENTS

| | | | |
|---|---|---|---|
| 988,508 | 4/1911 | Reynolds | 290/53 |
| 3,965,365 | 6/1976 | Parr | 290/53 |
| 4,036,563 | 7/1977 | Tornkvist | 60/398 |
| 4,048,801 | 9/1977 | Tornabene | 60/502 |

*Primary Examiner*—Ulysses Weldon
*Assistant Examiner*—Shelley Wade
*Attorney, Agent, or Firm*—Barnes, Kisselle, Raisch, Choate, Whittemore & Hulbert

[57] ABSTRACT

A device for extracting both kinetic and potential energy from the motion beneath waves over a considerable depth comprising a power member or sail guided to reciprocate with the movement of the water. The power sail is connected to and operates a power device such as an electric generator or pump. A second member, or sail, is located in geometric position relative to the power sail to reflect energy back to the power sail. Sensors, servo systems, and computers may be used to optimize power output. Multiple units can be arranged in "farms" to furnish megawatts of power.

29 Claims, 23 Drawing Figures

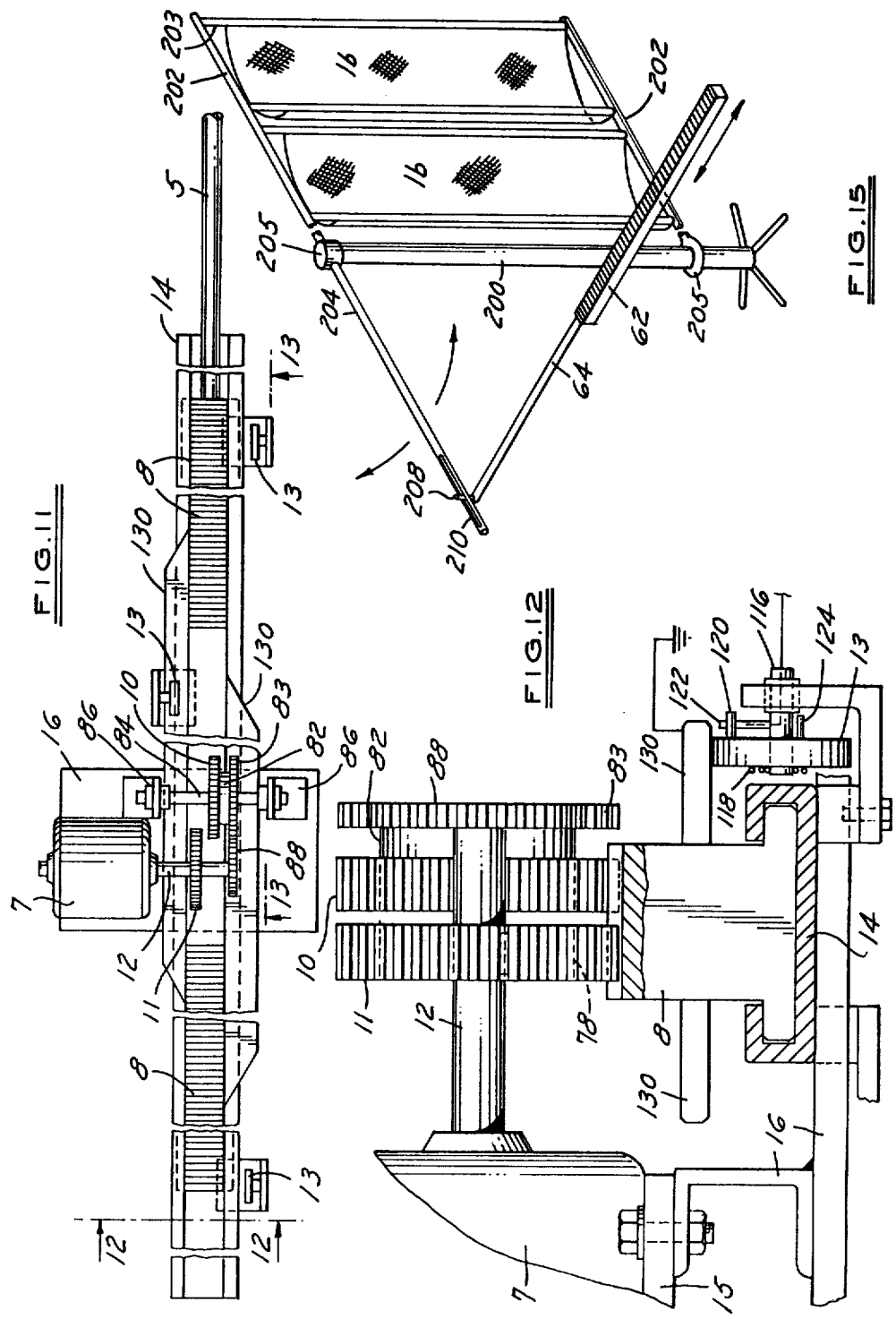

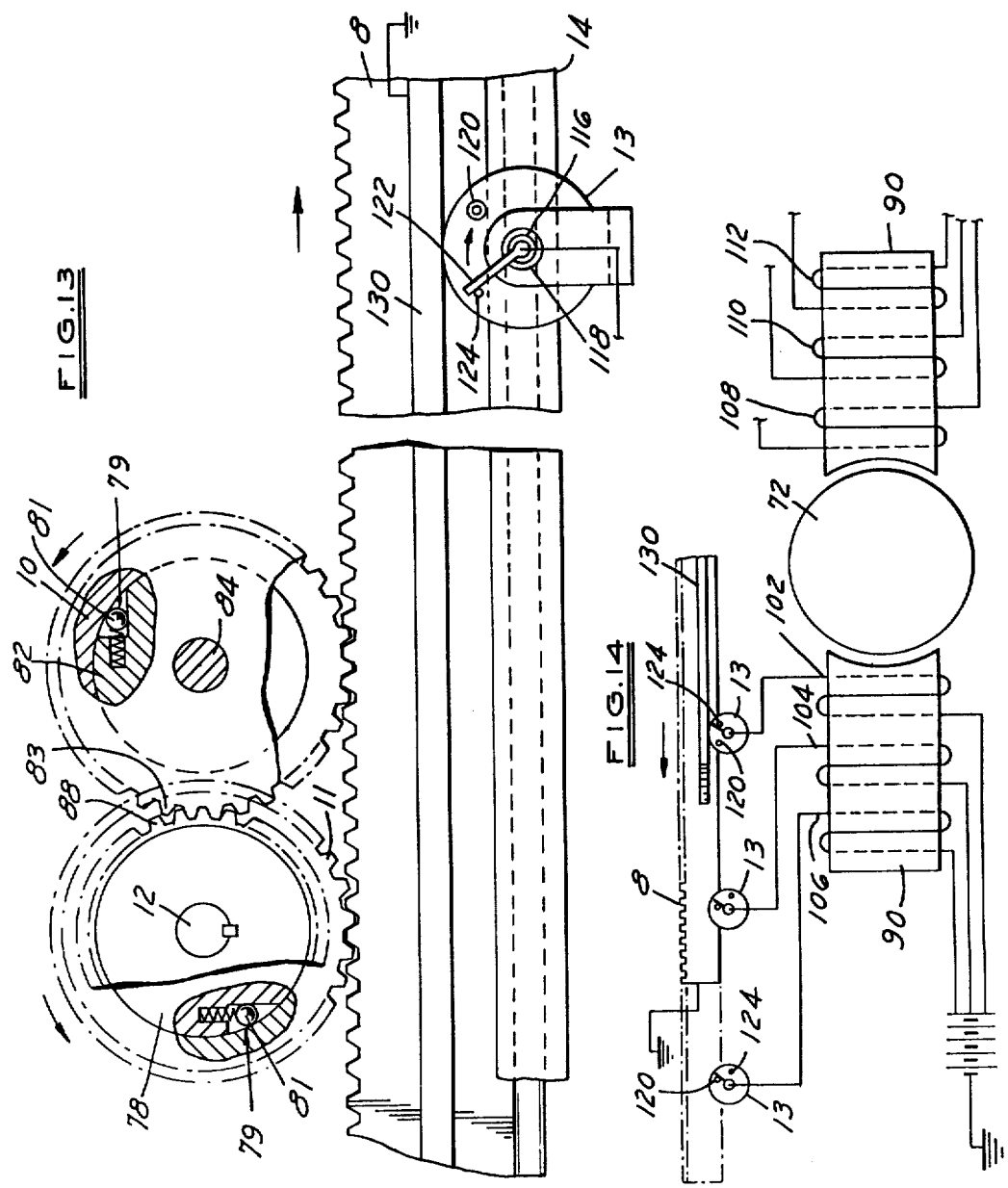

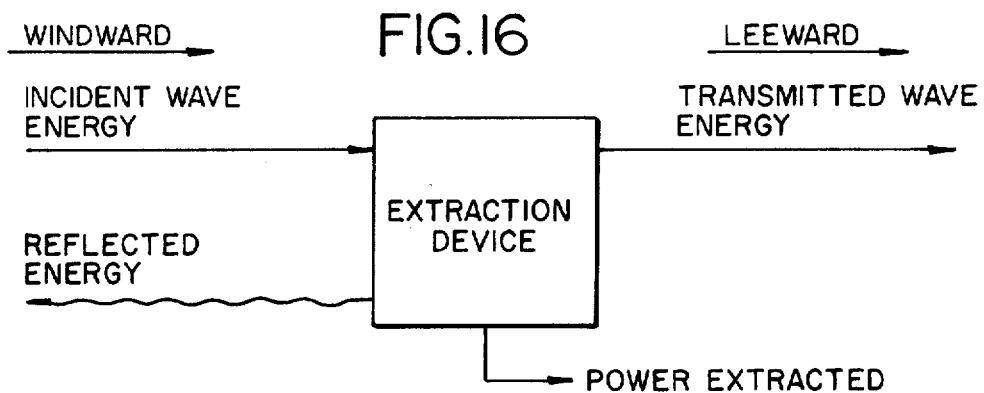
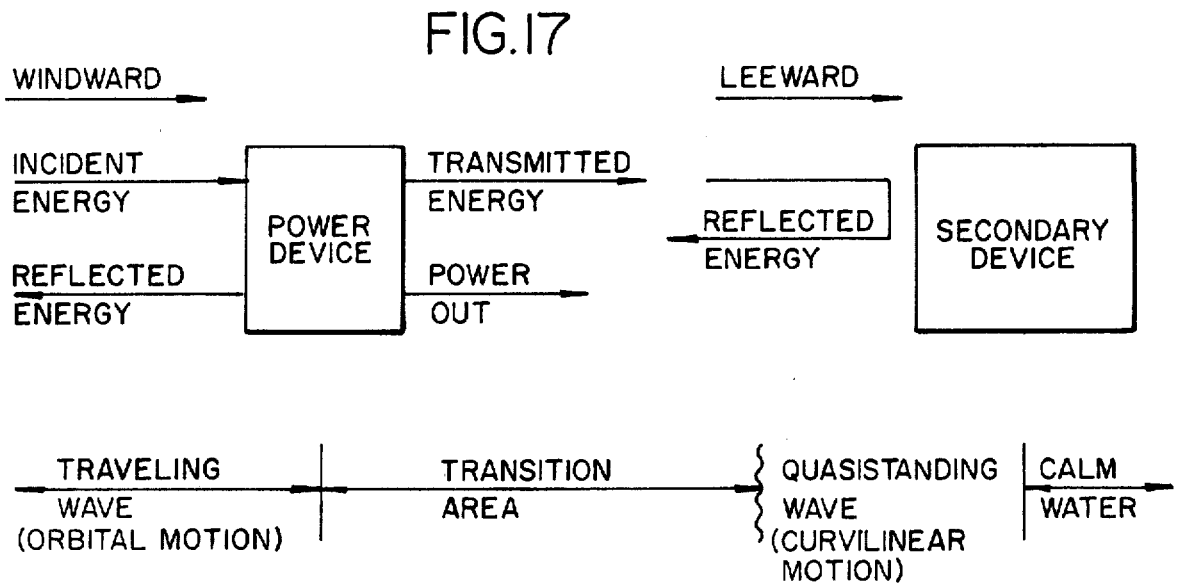
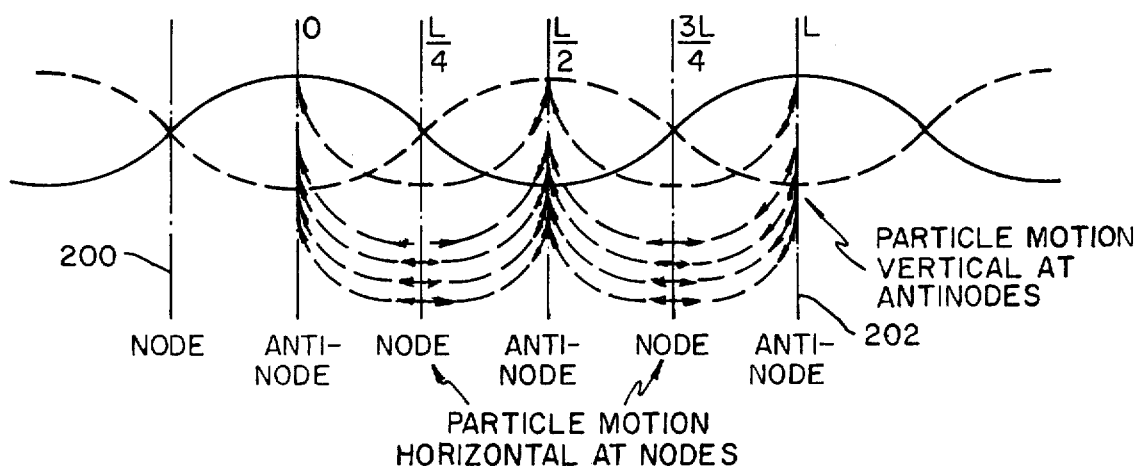

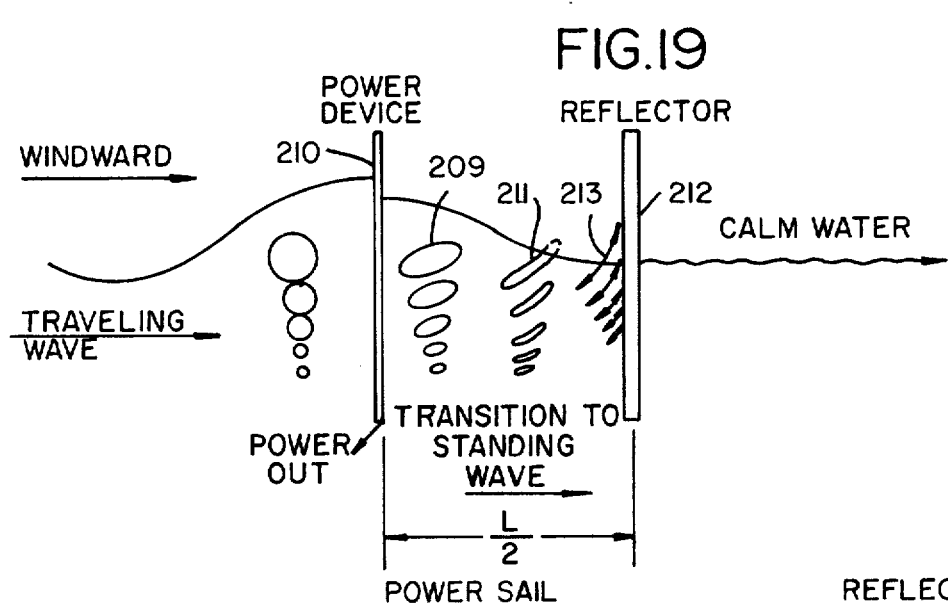
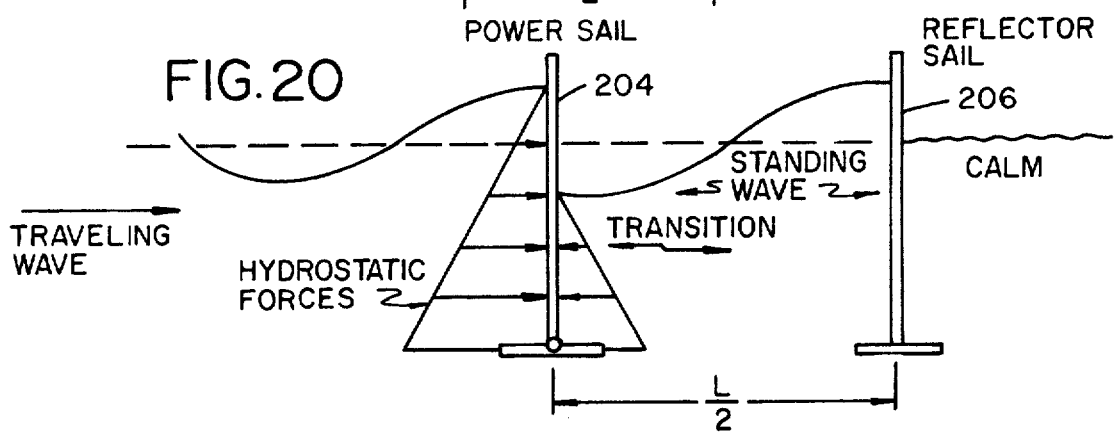
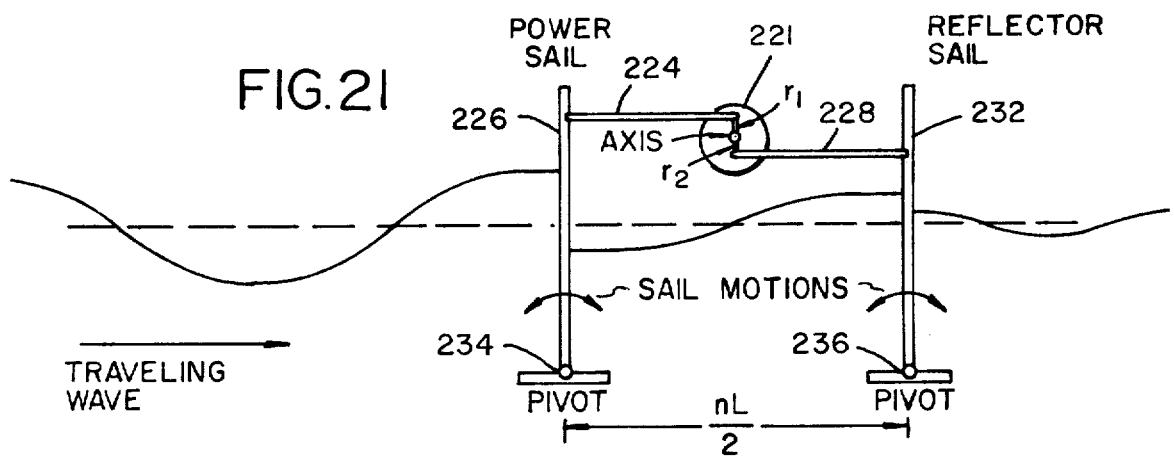

4,371,788

ENERGY DEVICE POWERED BY THE MOTION OF WATER BENEATH WAVES

REFERENCE TO RELATED APPLICATIONS

This application is a continuation-in-part of my copending application Ser. No. 56,186 filed July 13, 1979, which was a continuation-in-part of my copending application Ser. No. 861,967, filed Dec. 19, 1977 and now U.S. Pat. No. 4,170,738.

This invention relates generally to an energy device powered by the motion of water beneath waves.

SUMMARY OF THE INVENTION

It is well known that there is energy in the motion of water created by wind moving over the surface. The surface profiles are referred to as waves and various float-type devices have been designed to tap the energy at the air/water interface. The energy available in this region is only a portion of the total energy available, as the water particles are in motion to a considerable depth which will become evident in a later section hereof.

Wind moving over water transfers its energy to the water by setting the water in motion. This movement of the water is an essentially harmonic motion down to the ocean bottom. In deep ocean, the distance of water particle travel at a depth equal to one-half the wave length (wave length [L] is the distance from one crest to the next) is four percent of the distance of particle travel at the surface. Because energy is related to the square of the motion of water particles, over 99.8 percent of the total energy is within a depth of one-half the wave length from the surface. The amount of the wind's energy stored in the moving water beneath the waves depends primarily on the wind velocity and the length of time and the distance over which the wind has been blowing, since the wave height and wave length are determined by these conditions.

Float-type devices interacting at the water surface are relatively inefficient because they do not utilize the large amount of energy stored in the moving water beneath the wave profile. The total amount of energy stored in the water is of the two forms, kinetic and potential. An important object of this invention is to provide a device which will extract both forms of energy with high efficiency by interacting with the water beneath the waves to the depth necessary.

In accordance with a specific embodiment of the invention which is described in detail hereinafter, a power member is supported in the water in a manner such that it will be moved back and forth in an oscillatory manner by the movement of the water beneath the waves. This member is sometimes referred to hereinafter as a "sail" and preferably, although not necessarily, is constructed so as to change its profile with each reversal of the direction of water movement. The mathematical description of water motion below the surface of waves may be found in "Theoretical Hydrodynamics" by Milne-Thompson (Library of Congress 60-13815, pages 388-404), and "Estuary and Coastline Hydrodynamics" published by McGraw Hill (Library of Congress 65-27677, pages 24-54). Selected equations from these texts necessary to explain the movement of water beneath waves are presented in later sections hereof.

In accordance with further embodiments of the invention, a secondary component (sail) is used in conjunction with the primary or power sail to improve overall efficiency. The secondary sail may be operated in various modes which will be described later.

Numerous devices of the type contemplated by this invention may be grouped together in "farms" in the ocean or any large body of water to generate sufficient electrical energy to serve the needs of entire communities. Bearing in mind that the natural motion of the water is the source from which this energy output is derived, the system is non-polluting and does not deplete any of our natural resources.

These and other objects of the invention will become more apparent as the description proceeds, especially when considered with the accompanying drawings, wherein:

FIG. 11 is a view taken on the line 11—11 in FIG. 7 looking down on the structure.

FIG. 12 is a sectional view taken on the line 12—12 in FIG. 11.

FIG. 13 is a sectional view taken on the line 13—13 in FIG. 11.

FIG. 14 is a schematic view of a generator which may be operated by the device of FIG. 7.

FIG. 15 is a perspective view of a portion of device of modified construction for extracting kinetic and potential energy from the motion of water beneath waves.

FIG. 16 schematically illustrates that some of the incident wave energy is lost in the use of the power device as transmitted and reflected energy.

FIG. 17 depicts schematically an energy reflector used in conjunction with the power device.

FIG. 18 illustrates a typical standing wave, and related water particle motion.

FIG. 19 illustrates power and reflector devices, and shows traveling wave motion on the windward side of the power device, such motion transitioning toward standing wave motion between the devices in an "in phase relationship".

FIG. 20 is similar to FIG. 19, but shows a 180° out-of-phase relationship between the traveling wave on the windward side of the power device and the wave motion between the devices.

FIG. 21 shows a simple mechanical system for achieving a 180° phase shift between the traveling wave and the reflected wave.

Figure 22:
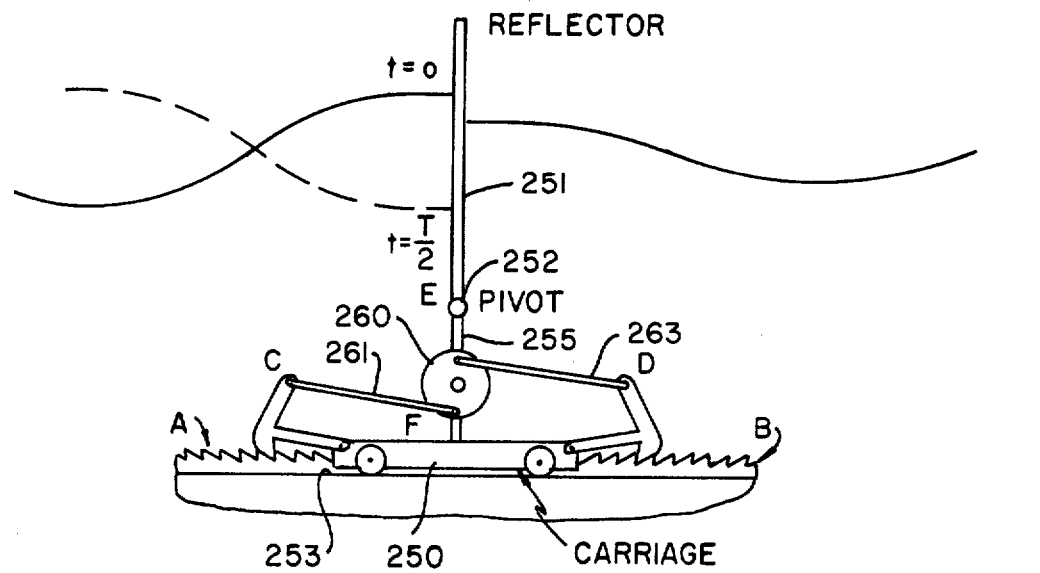

FIG. 22 shows a mechanism for adjusting the position of the reflector device or sail relative to the power device or sail.

Figure 23:
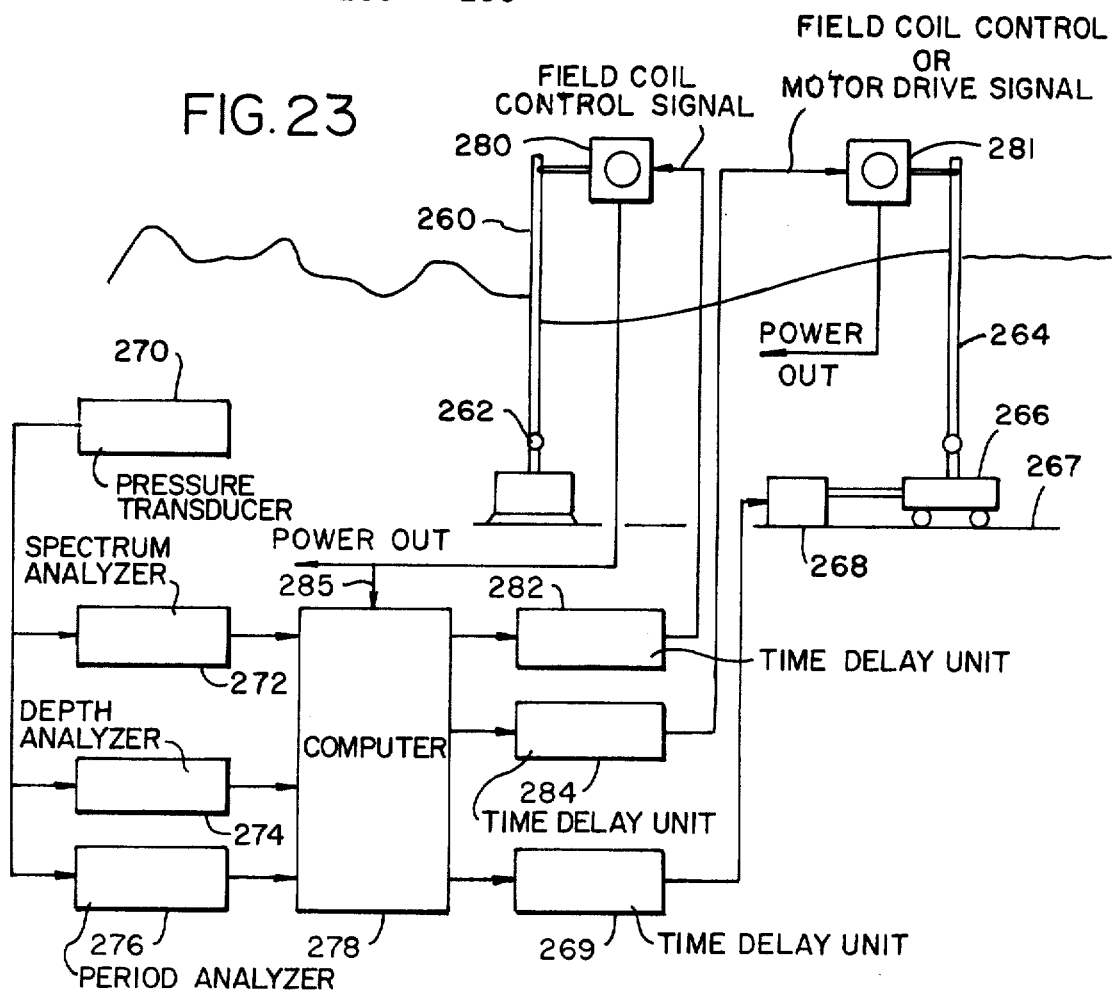

FIG. 23 shows the total system operated by a computer according to transducer signals. Positional signals drive the carriage to a preferred position relative to the power sail, while wave form information is used to either vary the damping and restoring forces or to drive a motor connected to the secondary sail depending on the mode of operation employed.

DETAILED DESCRIPTION

Figure 1:
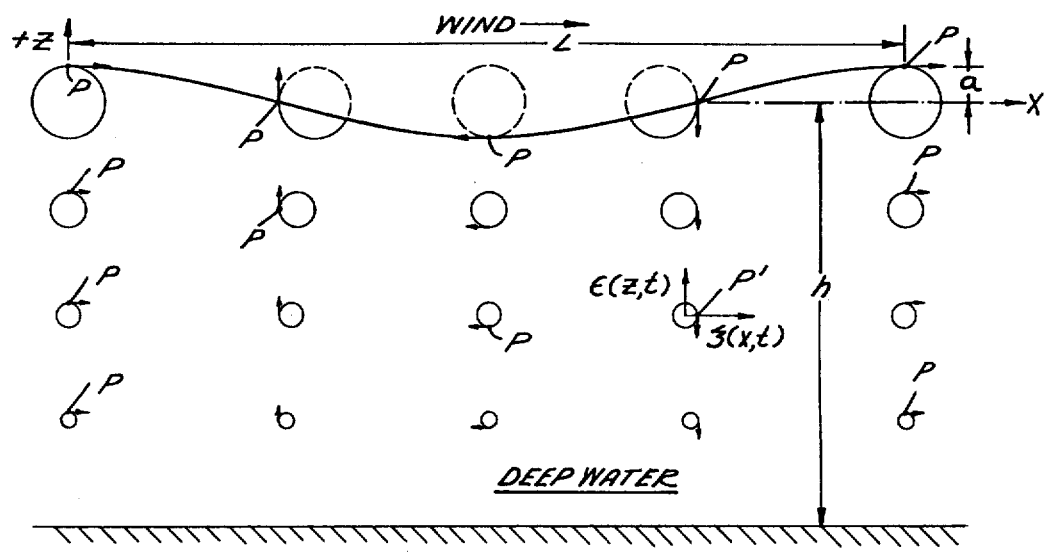
FIG. 1 is a diagrammatic view illustrating the movement of water particles beneath waves at different depths and at different points along the wave profile in deep water, the wave in theory being called a traveling wave.
Figure 2:
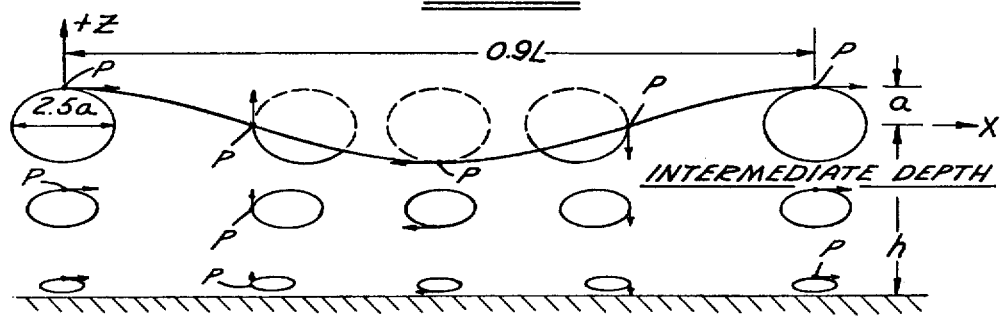
FIG. 2 is a diagrammatic view similar to FIG. 1 illustrating the movement of water particles in water of intermediate depth.
Figure 3:
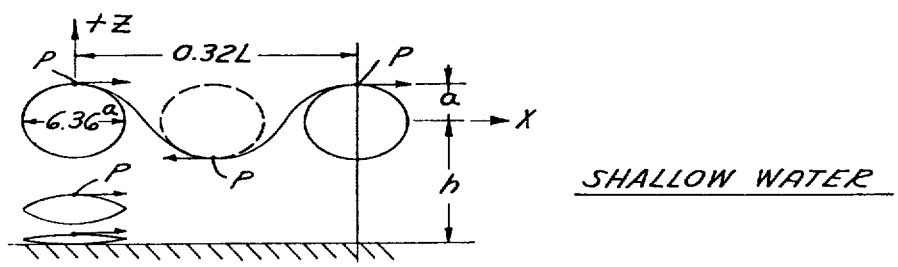
FIG. 3 is a diagrammatic view similar to FIG. 1 illustrating the movement of water particles in shallow water (not to scale).

Referring now more particularly to the drawings, and especially to FIGS. 1-3, there are shown diagrammatic views of wave motion in a body of water such as an ocean or lake, as well as the motion of water particles P beneath the waves in deep water (FIG. 1), in water of intermediate depth (FIG. 2) and in shallow water (FIG. 3). In all the figures, the direction of the "wind" is indicated (or windward, leeward as directions). Although the water particle motion is in a general sense a direct result of the wind, there may be a significant difference between the local wind direction and the direction of the primary wave front. Therefore in the text and figures the terms wind, windward, and leeward will be used diagrammatically to suggest the direction of propagation of the principle wave energy, and do not relate necessarily to the local wind conditions.

Wave motion in a traveling wave gives the appearance of water traveling at a steady rate in one direction. Actually it is only the wave profile which appears to move in this manner. The water beneath the waves has an essentially harmonic motion in which the water molecules or particles P move in orbital paths or streamlines. The orbital paths of the water particles P at varying distances beneath the surface are shown in deep water in FIG. 1, in water of intermediate depth in FIG. 2, and in shallow water in FIG. 3 (FIG. 3 is not to scale).

As the wave profile moves from deep ocean toward the shore the period (T), i.e., the rise and fall of a crest to a trough to a crest, is constant. The general relation is $$L = \frac{gT^2}{2\pi} \tanh \frac{2\pi h}{L}$$

where L is the distance from one crest to the next and where 'g' is the acceleration due to gravity. According to this equation the wave length will become shorter as the water decreases in depth. For shallow water $L = \sqrt{gh}\ T$ and for deep water $L = 5.12T^2$ with only a few percent error. These relations correspond with the observation of long swells in open ocean and the much shorter wave length observed near shore.

In deep water, that is where the depth of the water h (measured from the ocean bottom or floor to a point half way between the wave crest and the wave trough) is greater than ½ the wave length L (h/L > ½), the orbits will be nearly circular as seen in FIG. 1. In shallow water, that is where the depth of the water h is less than 1/20 of the wave length (h/L > 1/20), the orbits of the water particles will be of flattened or elliptical form as shown in FIG. 3. In water of intermediate depth, that is where the depth h is greater than 1/20 but less than ½ of the wave length (½ > h/L > 1/20), the orbits of the water particles will be elliptical as shown in FIG. 2. The elliptical orbits at intermediate depth are flattened but not as much as in shallow water.

The orbital path of any water particle, such as the particle P' in FIG. 1, beneath the wave profile can be given by the relation $$\frac{\xi^2}{A^2} + \frac{\epsilon^2}{B^2} = 1;$$

which is the general equation for an elliptical orbit, wherein $\xi$, $\epsilon$ are the horizontal and vertical particle displacements respectively, and the coefficients A and B described the flatness of the ellipse, as shown in FIGS. 1, 2, and 3. With 'a' equal to one-half the wave height (FIG. 1) and using $$\frac{2\pi}{L} = k$$

for simplicity, the expressions for A and B are $A = [a \cosh k\ (h+z)]/\sinh kh$ and $B = [a \sinh k\ (h+z)]/\sinh kh$, wherein x and z are horizontal and verticle coordinates measured from origin 'O' as shown in FIG. 1. With one or two percent error $A = B = ae^{kz}$ for deep water and the orbital paths become circular. The radius of the orbits will decrease from the surface to the bottom as this is the negative z direction as shown in FIGS. 1-3. For shallow water with small error, $A = a/kh$ and $B = a(1 + z/h)$. Substitution of values for this condition will show that the to and fro motion along the horizontal is greater than 'a', and that the vertical dimension of the ellipse will decrease as the bottom is approached. The importance of the greater to and fro motion in shallow and intermediate depth water will become apparent later.

FIGS. 1 to 3 illustrate the different positions of the water particles P in their orbits at different points along the wave profile. It will be understood that there are innumerable water particles moving in this same manner, although only a few are shown. At any particular point along the wave profile, all particles vertically therebelow will be in the same relative position in their orbits. Thus at the wave crest shown in the extreme left position of FIGS. 1 to 3 where x=0, and z=+a, all of the water particles directly thereunder are at the tops of their orbits. These particles are moving horizontally to the right in the direction of wave movement as indicated by the arrows. The length of the arrows is a measure of the speed at which the particles are moving. At the wave trough in the center of FIGS. 1 to 3, where x=½L, all of the water particles directly therebelow are at the bottom of their orbits and moving horizontally to the left. The water particles at the position where x=¼L are moving vertically upward, and the water particles at the position where x=¾L are moving vertically downward. With each of these particles, there is associated a mass and a velocity vector, and hence kinetic energy which may be extracted and converted to power.

Figure 4:
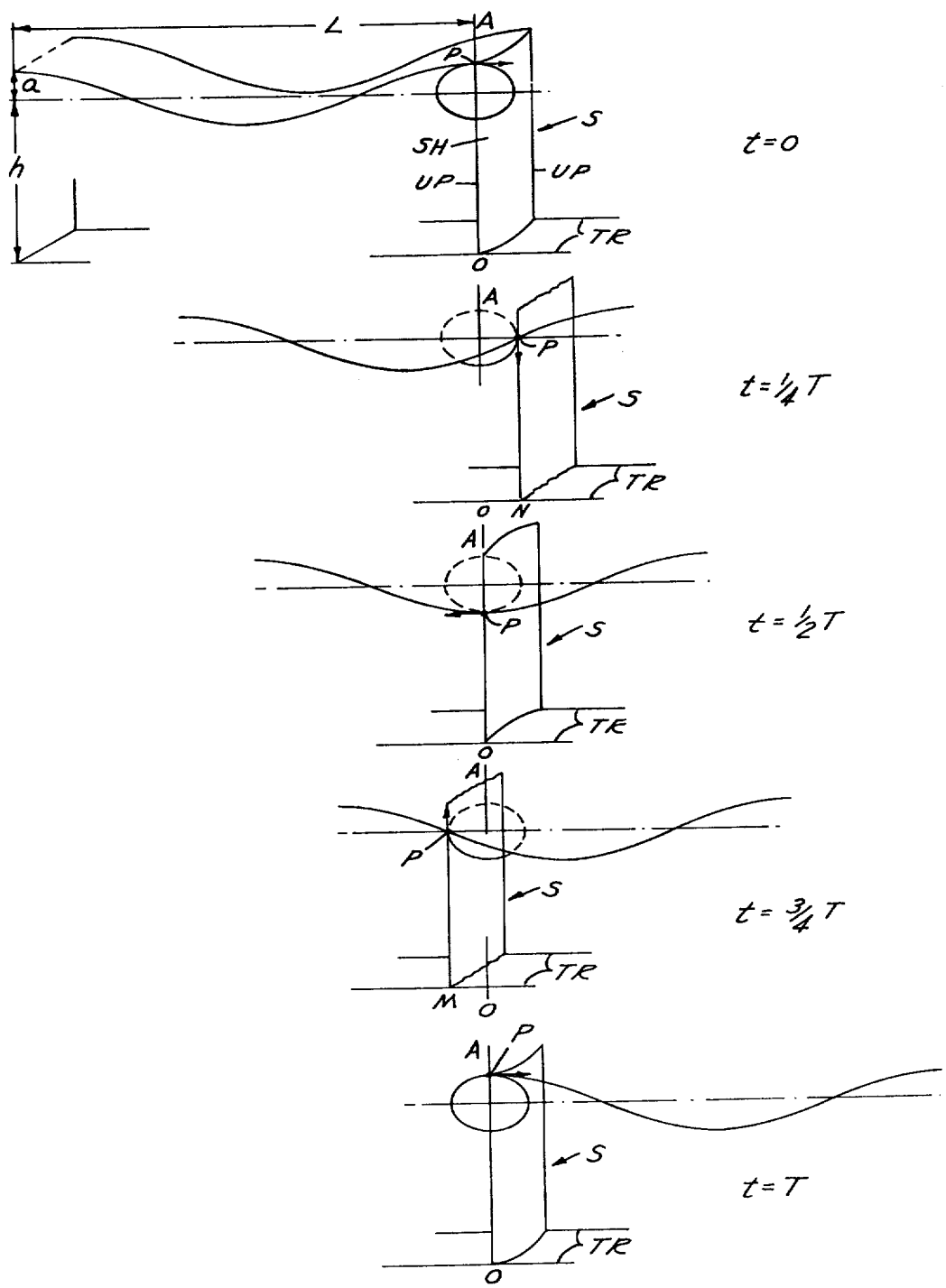
FIG. 4 is a diagrammatic view of a sail disposed upright in the water in several different positions with respect to a traveling wave in water of intermediate depth.

FIG. 4 illustrates diagrammatically a sail S disposed upright in the water in several different positions with respect to a wave moving toward the right. While the sail is preferably disposed vertically, it may be disposed at other angles, if desired. FIG. 4 also shows one of the water particles P at each sail position. Spaced parallel tracks TR fixed with respect to the floor of the body of water extend in the direction of wave movement and hold the sail S upright while supporting it for back and forth movement. The sail may consist of the laterally spaced upright members UP having a sail sheet SH therebetween which may be flexible.

The sail in position $t=0$ (wherein t represents time, as a variable) is shown at the crest of a wave and is illustrated in the central point 0 along the tracks coinciding with the ordinate A0. The water particles at this point in the wave profile are at the tops of their orbits and moving to the right, thus urging the sail to the right causing it to billow in that direction. One-fourth of a period later at position $t=\frac{1}{4}T$, the sail will be at point N along the tracks. The water particles at this point in the wave profile are moving downward so that the sail is slack. One-fourth of a period later at position $t=\frac{1}{2}T$ at the trough, the sail is back to the point 0, having been moved to that position by the leftward movement of the water particles. Note that the sail is now moved to the left. One-fourth of a period later at position $t=\frac{3}{4}T$, the sail has been moved leftward to the point M along the tracks and at this point in the wave profile the water particles are moving vertically upward so the sail again is slack. One-fourth of a period still later at position $t=T$, when the next crest reaches the sail, the sail will be at point 0 which is identical to position $t=0$. The sail will continue to move back and forth in this manner under the influence of the motion of the water beneath the waves.

The horizontal velocity component is $$u = -\frac{\partial \phi}{\partial x}$$

and the vertical component is $$v = -\frac{\partial \phi}{\partial z}$$

where $\phi$ is called the velocity potential function and is expressed as $\phi=[ag \cosh k(h+z)]\cdot[\cos(kx-\sigma t)]/[\sigma \cosh kh]$ which satisfies Bernoulli's equations (the universally accepted principles of fluid dynamics) for the cases under consideration herein. All terms have been previously defined except $\sigma$ which is $\sigma=2\pi/T$. The above expression is important in that it not only defines the direction of particle motion on the path, but also describes the wave profile. Note that $\phi$ is also harmonic in time according to accepted practices for defining harmonic motion, i.e. periodic in time.

Figure 5:
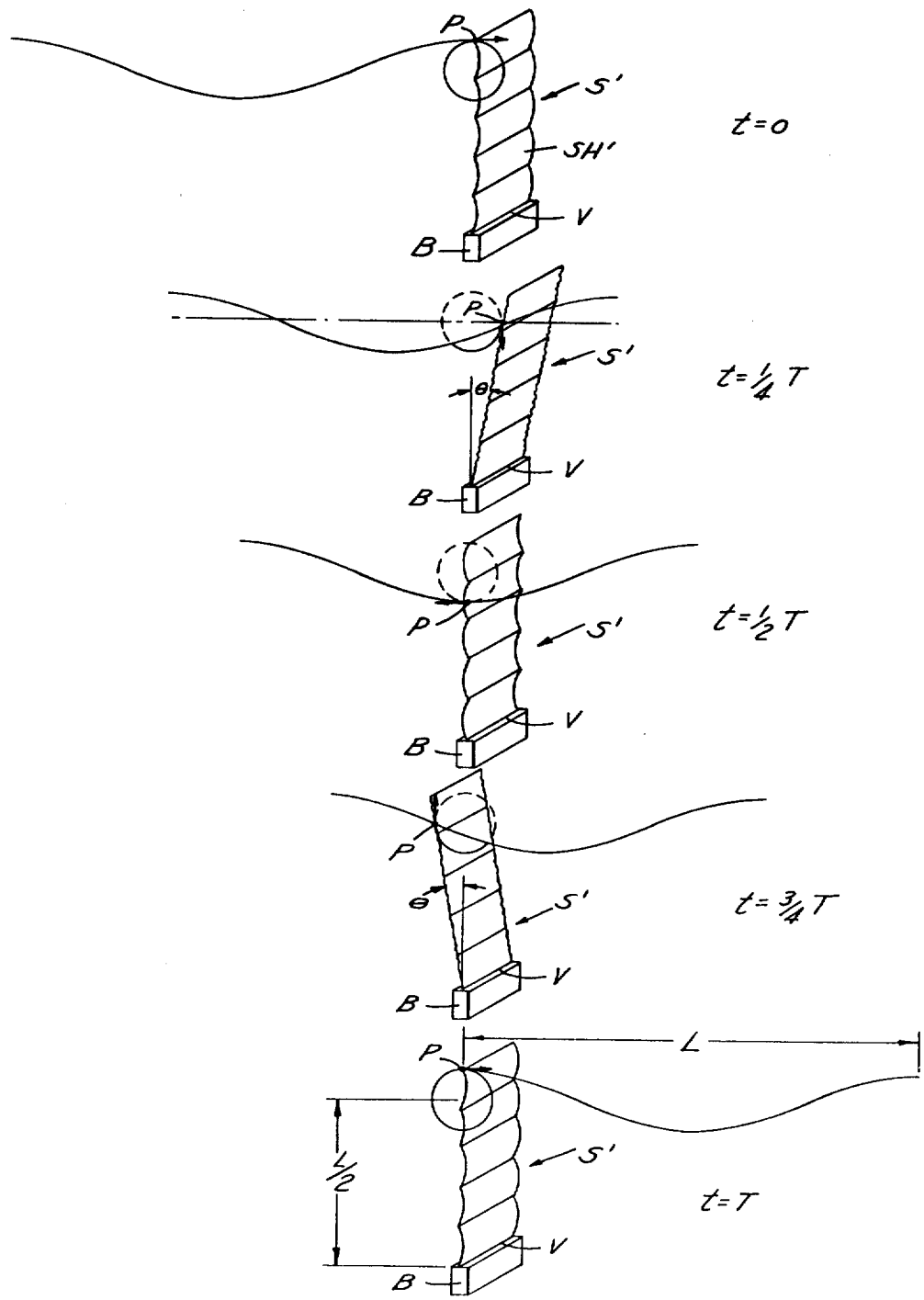
FIG. 5 is a diagrammatic view similar to FIG. 4 illustrating a sail of modified construction in several different positions with respect to a traveling wave in deep water.

FIG. 5 is similar to FIG. 4 in that it shows diagrammatically a sail S' disposed generally upright in the water in several different positions with respect to a wave moving toward the right, but in this instance the sail is supported for pivotal movement. As shown, the bottom of the sail is pivoted at V on a base B fixed with respect to the floor of the body of water for pivotal movement back and forth in the direction of wave movement. One of the water particles P is shown at each position.

The sail S' moves back and forth about its pivot axis and is in its neutral vertically upright position at the wave crest (positions $t=0$ and $t=T$), and at the wave trough (position $t=\frac{1}{2}T$). At the intermediate positions $t=\frac{1}{4}T$ and $t=\frac{3}{4}T$, the sail is shown pivoted by an amount $\theta$ in opposite directions away from the neutral position. Thus the movement of the sail S' in FIG. 5 is comparable to that of the sail S in FIG. 4 except that it moves about a pivot. FIG. 5 illustrates a somewhat different sail construction. The sail of FIG. 5 is of a "square rigger" shape having sheets SH' arranged one above the other and secured to the frame along their generally horizontal top and bottom edges. It will be understood that a "square rigger" sail may be used in the FIG. 4 construction, and that the plain sail of FIG. 4 may be used in FIG. 5.

Figure 6:
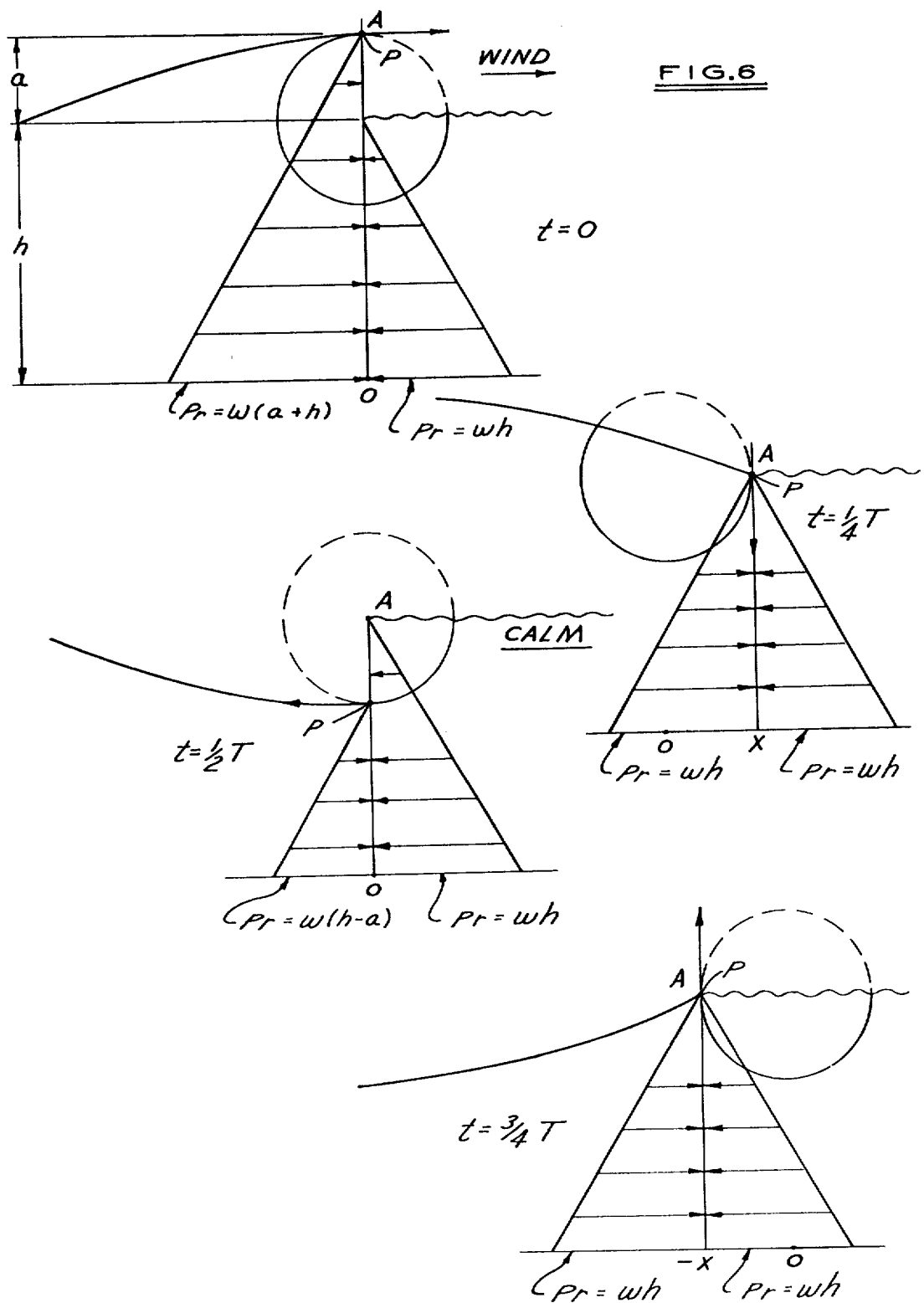
FIG. 6 is a diagrammatic view illustrating the hydrostatic forces acting on a sail at different times during movement of the wave profile with respect thereto.

FIG. 6 is a description of how the sail extracts potential energy from the to and fro motion. The equations used previously can be arranged and then integrated over a wave length and depth to determine the total amount of energy available. The total amount of energy is comprised of two components, the kinetic energy and the potential energy. The first is associated with the water movement, i.e., mass and velocity, the second is associated with the ability of a mass of water to fall a distance due to gravity. While the mathematics are complicated, the results are simple. Each of the energies is equal to $Wa^2L/4$ where W is the weight of a unit volume of water. The difference in water height on each side of the sail can be interpreted in the manner of water behind a dam. Analytically, since a net force in the direction of motion occurs, the potential energy will be converted to useful energy. The total energy is then $Wa^2L/2$.

FIG. 6 depicts a rightward moving wave with calm water on the right side. At $t=0$ the wave crest is at a higher elevation than the water on the right side, the left side will see the maximum hydrostatic pressure equal to $W(a+h)$ for a force to the right of $(W/2)(a+h)^2$. The right side will have a maximum pressure equal to Wh acting to the left on the area h. A unit width of one foot is assumed. The net force to the right will be $(W/2)(a^2+2ah)$. At $t=\frac{1}{4}T$, the wave profile will have moved to the position shown and the forces on each side will be equal. At $t=\frac{1}{2}T$, the wave profile will be as shown, the maximum pressure on the right side will be equal to Wh while the pressure on the left side will have a maximum of $W(h-a)$. Multiplication by the respective area yields a net force to the left which is in phase with kinetic energy being absorbed as the particles are moving leftward. At $t=\frac{3}{4}T$, the profile is as shown and the forces on each side are balanced. At $t=T$ the cycle has been completed with a return to the original position. Position $t=T$ is not shown but is identical to position $t=0$.

The rigid sail structure as shown in FIG. 6 may be modified by substituting a flexible sail which may become attractive since it not only extracts the available kinetic and potential energy from the wave, but the billowed surface may present a lower drag profile to the shoreward side.

Figure 7:
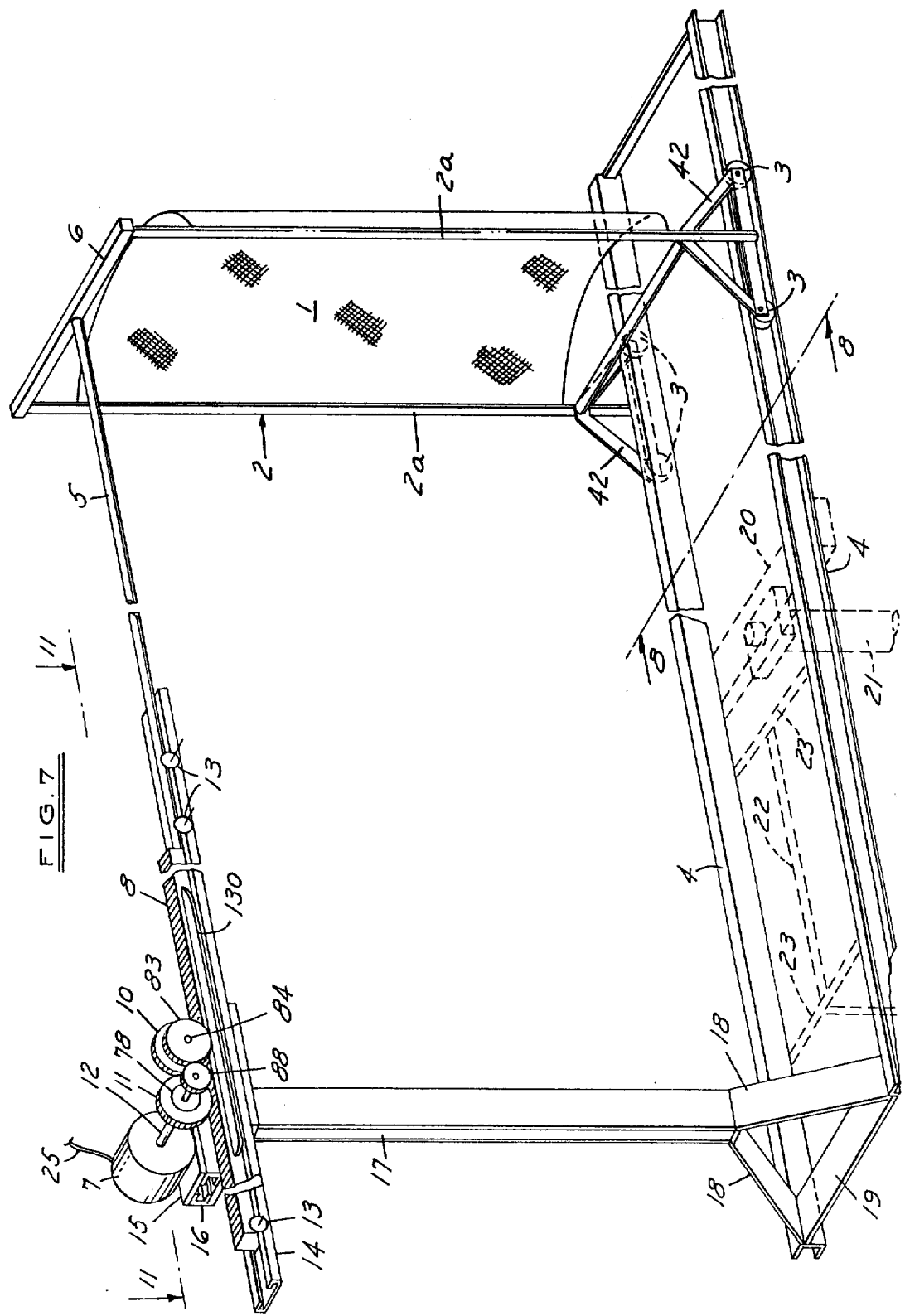
FIG. 7 is a perspective view of a device for extracting both kinetic and potential energy from the motion of water beneath waves constructed in accordance with the invention.

FIG. 7 is a diagrammatic illustration of a simple sail-type device for extracting energy from the motion of water beneath waves. A sail 1 is preferably supported vertically in the water by the uprights 2a of frame 2. As above stated the sail could if desired be disposed at an angle to the vertical. The frame is guided as by rollers 3 running on tracks 4 or other means which extend in a direction perpendicular to the wave front and may be supported on or above the ocean floor. When the wave particles are moving to the right the sail will billow as shown. The sail may be a sheet of rigid or flexible material the total width of which is somewhat greater than the distance between the uprights 2a to which its edges are attached. A rod 5 is attached to frame cross piece 6 to transfer the energy from the said and frame to any suitable power device which could, for example, be a pump but is illustrated herein as a generator 7. The leftward portion of the rod is a linear gear or rack 8 which engages gears 10 and 11 whose functions will be explained subsequently. There are many mechanical means for converting linear motion to rotational motion but it will be appreciated that the sea state or wave height will vary and thus, motion of water particles and therefore the stroke of the rod will vary. For efficiency reasons, it is desirable that the armature of the generator with shaft 12 rotate in one direction only. The purpose of the small wheels 13 attached to guide 14 for rack 8 is to maintain a desired relative position for motion of the sail which is necessary for a device which is subject to tides and current. Their action will be explained subsequently.

The generator 7 is attached to mount 15 and supporting plate 16 and thence to vertical support 17. Members 18 and 19 rigidly attached to the rails 4 complete the supporting structure. The generator has an armature 72 (FIG. 14).

Referring now to FIGS. 11-14, the generator armature 72 has a shaft 12 extending over the top of the linear gear or rack 8. Gear 11 on the shaft meshes with the teeth of the rack 8. This gear 11 is in the form of a ring (FIG. 13) rotatably mounted on a disc 78 keyed to the generator shaft 12. A one-way clutch 79 of conventional design is provided between the disc and the gear ring so that the gear ring will drive the generator shaft when turned in one direction but not in the other. This clutch may comprise a spring-pressed ball 81 wedged between tapered surfaces of the gear ring and disc. As seen in FIG. 13, when the rack 8 moves in the direction of the arrow to the right, the gear 11 is rotated counterclockwise and drives the generator shaft in a similar direction through the one-way clutch. On the other hand, reverse rotation of the gear when the rack 8 moves to the left causes the clutch 79 to unlock.

A second gear ring 10 in mesh with the rack 8 is rotatably supported on a disc 82 which in turn is rotatably mounted upon a shaft 84 mounted to the support 16 by the brackets 86 (FIG. 11). As best seen in FIG. 13, the disc 82 has a toothed portion 83 in mesh with a gear 88 keyed to the generator shaft 12. There is a second one-way clutch connection 79 between the gear ring 10 and the disc 82 such that rotation of the gear ring in one direction will drive the disc 82 but rotation in the opposite direction will permit the gear ring to rotate freely on the disc. As seen in FIG. 13, when the rack 8 moves to the left, clutch 79 between gear ring 10 and disc 82 will lock, driving disc 82 clockwise. The tooth portion 83 of disc 82 drives gear 88 and generator shaft 12 counterclockwise which is the same direction of rotation produced by rightward rack movement through gear ring 11. Hence the generator shaft is turned in the same direction by both directions of rack movement. The generator 7 is shown in FIG. 7 as having a cable 25 by means of which electricity generated thereby can be transmitted to a power distribution center or directly to an electric motor or other device to operate the same.

When the apparatus of FIG. 7 is placed in the water and oriented with tracks 4 parallel to the direction of movement of the water beneath the waves, the sail 1 will be moved back and forth by the water. When the water particles are moving to the right, they push the sail to the right. When they move to the left, they push the sail to the left. The rod 5 is similarly moved right and left, driving the generator rotor in the same direction of rotation during both the in and the out movement of the rack through the gearing provided. The generator may be of standard construction operating in a field provided by the permanent magnet 90 (FIG. 14) to generate electricity.

Figure 8:
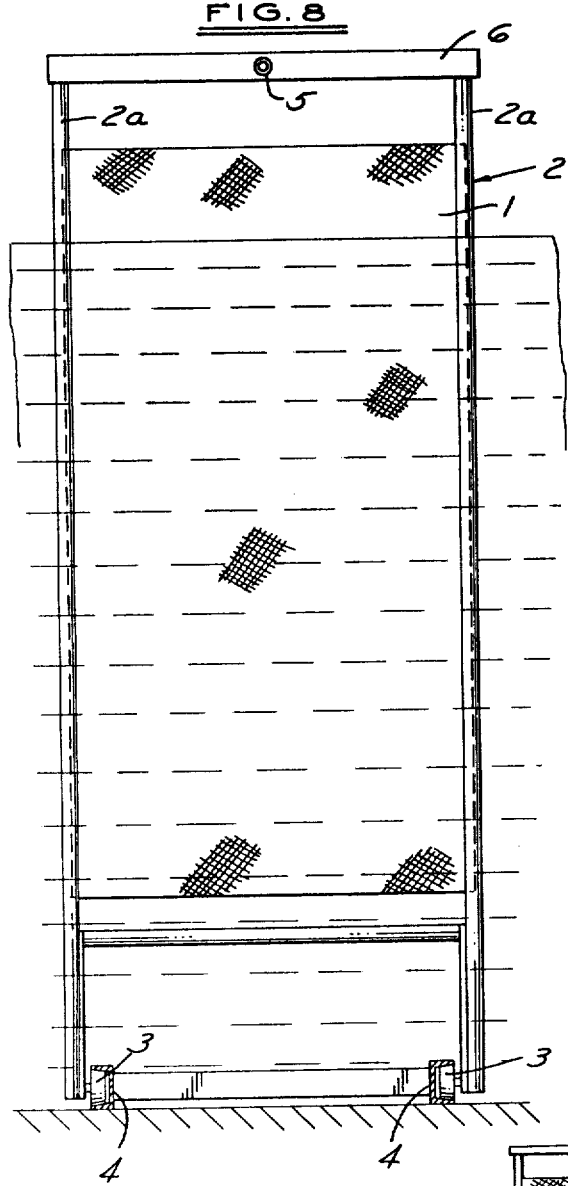
FIG. 8 is a view of the sail portion of the device taken on the line 8—8 in FIG. 7.

The vertical height of the sheet portion of the sail may be such that it extends above the crest of the waves and down sufficiently far to tap much if not most of the energy in the moving water. FIG. 8 illustrates the upper portion of the sail projecting above the surface of the water. The rack and generator structure may be disposed above the water surface and clear of the water, although this structure can and will operate efficiently under water when designed for the environment, i.e., hermetically sealed.

The apparatus of FIG. 7 may be supported with the rails in fixed position, or it may be articulated or supported so as to permit the orientation of the sail to be changed as the direction of water movement changes. FIG. 7 shows in dotted lines one means for changing the orientation of the apparatus of FIG. 7 although other mechanical and/or electronic devices may be designed. As shown, a plate 20 is secured to and supports rails 4, and a post 21 anchored on or above the sea floor pivotally supports the plate 20 for movement about a vertical axis. The upright rudder 22 secured to the rails 4 by brackets 23 extends parallel to rails 4 and causes the device to turn on the post 21 automatically in response to changes in the direction of water movement so that the rails 4 of the apparatus at all times will be parallel to the direction of movement of the water beneath the waves and its sail perpendicular thereto. It will be understood that suitable electronic and/or mechanical devices may be used to orient the previously described configurations of said structures.

Although the movement of the sail structure back and forth occurs generally within the same limits of movement, the said central point (average position) at times has a tendency to move away either shoreward or out to sea, depending upon the general movement of the total body of water which may occur as a result of tidal action or current, for example. Also, variations will naturally occur in wave height from one wave to the next. Means are therefore provided such that the sail will have nearly the same central position for each cycle even though the motion of the sail may be greater in either direction from the cycle to the next. Generally, means for accomplishing this function are categorized as adaptive controls or position servo systems. In the specific embodiment shown, this function is accomplished by adding generator coils to increase the field strength when the sail structure moves beyond predetermined limits.

Referring to FIG. 14 which is a schematic view of the relation between the rack and generator, the generator armature 72 is shown turning in a field provided by the permanent magnet structure 90. The field, while necessary for the generation of electricity, nevertheless imposes a certain resistance on the ability of the armature to turn. This resistance can be increased by energizing one or more of the coils 102, 104, 106, 108 110 or 112 depending upon the amount and direction of the average motion from the neutral position. Three such coils are shown at the left in FIG. 14 and three similar coils, although not illustrated completely, are provided at the right. The circuit of each coil in FIG. 14 includes a contact roller 13. As seen in FIG. 13, each roller 13 is rotatably mounted on a shaft 116 but biased by a torsion spring 118 to bring its insulated post 120 into contact with the contact arm 122 rigid with and projecting radially from shaft 116. The roller has a terminal 124 in circumferentially spaced relation from the insulated post. Note that FIG. 13 is a reversed sense in that rack motion and cam rotation are opposite that of FIG. 14 but the principle is the same.

Again considering FIG. 14, when the sail structure position moves too far to the left in relation to the central position, it causes the elongated cam 130 to frictionally engage the periphery of the first roller contact 13. The roller contact is turned counterclockwise to bring its terminal 124 into contact with the arm 122, thereby closing the circuit of coil 102 through the axle shaft 116, the arm 122, terminal 124, roller 13 and the grounded rack cam 130. Continued movement of the rack 8 to the left allows the roller to skid on the cam and to maintain the electrical contact closing the circuit of the coil. However, when the rack reverses and moves to the right, frictional contact with the cam turns the roller 13 clockwise into contact with the insulated terminal 120 to break the circuit. The roller 13 skids on the cam until the cam moves out of engagement with it. During the time the coil 102 is energized, additional field current is applied to resist rotation of the armature 72 and thereby increasing the resisting force on the sail and limiting the maximum displacement of the sail structure. The coil is, however, deenergized upon reversal of the sail structure.

Should the sail structure continue leftward despite the added resistance of field current in the coil 102, additional coils 104 and 106 may be provided to add still more field current to limit the displacement of the sail.

As noted above, similar coils including roller contacts 13, etc., are provided to limit motion of the sail in the opposite direction.

For the sake of convenience and if desired, the rollers 13 may be distributed on both sides of the rack 8, in which event cams 130 to operate the rollers are provided on both sides of the rack.

It will be appreciated that increasing the electrical field strength, increases the electrical power output of the generator. This adaptive control feature will therefore capture a maximum amount of energy available in water in varying sea states. This embodiment is a specific example of a general class of control devices employed to provide proper connecting (restoring and damping) forces for reciprocal motion. The most common devices are the spring and the dashpot respectively. The variable field strength generator is an example of an improvement thereto called an adaptive control device, wherein such connecting forces provided are varied or allowed to vary to compensate for changes in the applied forcing function—in this case the incident waveform.

Nature can provide a simple displacement servo by the following embodiment. The masts or frame members shown supporting the sail may be hollow and sealed and thus bouyant. In this configuration, a net bouyant force will always act vertically on the mast. This force, since it is always vertical will create a restoring torque to the vertical whether the sail is tilted left or right. The torque is conservative in the sense of physics i.e. non-dissipative and thus does not decrease the power available to the generator. Should a larger torque be desired, it may be obtained by rigidly attaching a streamlined bouyant to the mast at a point where submergence is assured, but a high torque is obtained.

Figure 10:
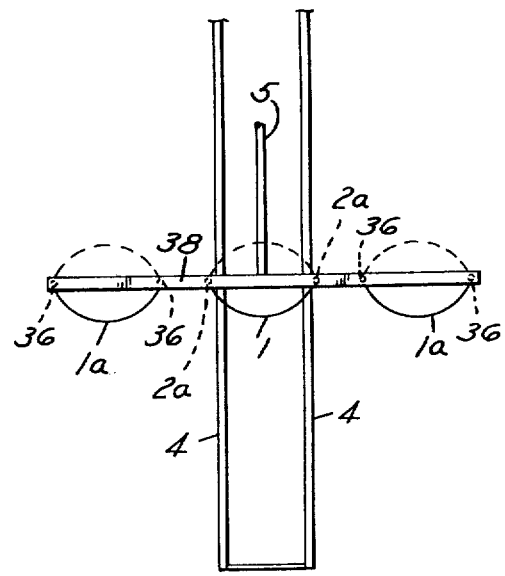
FIG. 10 is a top plan view of the structure shown in FIG. 9.
Figure 9:
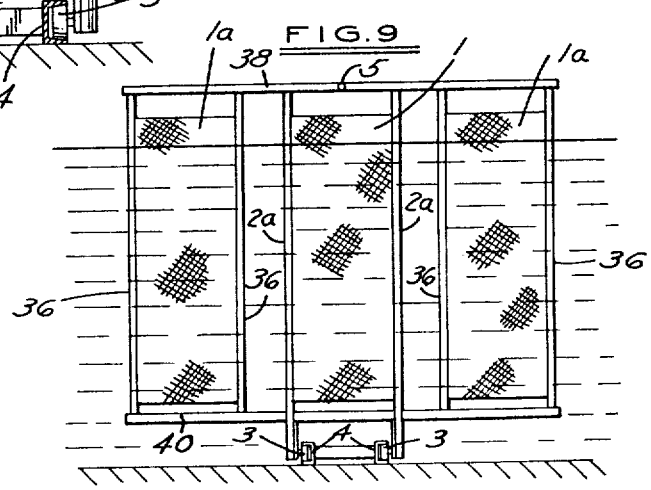
FIG. 9 is a view similar to FIG. 8 but shows a modification having a plural sail structure.

FIGS. 9 and 10 show a modification of the sail structure. Comparing FIGS. 8 and 9 it will be seen that the sail structure of FIG. 9 differs from that of FIG. 8 essentially only in the provision of additional sail sheets in side-by-side relation. Two additional sail sheets 1a are shown in FIGS. 9 and 10 supported on either side of the central sail structure by lateral extensions 38 and 40 of the top and bottom frame members and by additional vertical frame members 36. Obviously, any number of additional sail sheets could be provided. The provision of additional sail sheets allows the sail structure to interact with more of the moving water and thus take advantage of a higher percentage of the energy present in the wave motion. The apparatus of FIGS. 9 and 10 can be made self-orienting, if desired, in the same manner as the apparatus of FIG. 7.

Although FIG. 5 illustrates the deep water case, wherein the sail oscillates about a horizontal pivot axis at the bottom of the sail, this could also be used at intermediate or shallow depths if that is desired.

FIG. 15 shows a further embodiment in which the sail structure is mounted on an upright post 200 anchored on or above the sea floor. The frame structure has horizontal and vertical frame members 202 and 203, the horizontal members being connected to rings 205 pivoted to the post 200 so that the frame structure may turn about the axis of the post. Any number of said sheets may be employed and in this instance, two sail sheets 1b are provided side by side in upright position which will be responsive to the movement of the water in a manner similar to that previously described. The frame structure has an arm 204 extending from the post 200 on the diametrically opposite side of the post 200 from the sail structure but rigidly secured thereto so as to turn as a unit therewith. This arm 204 is connected to rod 64 by a pin 208 on rod 64 in slot 210 in the end of arm 204. The rod 64 is connected to a rack 62 which may be identical to the rack 8 in FIG. 7 and may operate and have the same relationship to the generator structure 7 shown in FIG. 7 although not further illustrated in FIG. 15. The pin and slot connection 208, 210 is necessary to prevent binding which might otherwise result due to the fact that the rack 62 is guided for straight line reciprocation. It is important to note that the central position for FIG. 15 can be varied to account for changes in the direction of the water movement. Within limits, the device of FIG. 15 is self-orienting. This assures maximum capture and transfer of energy.

As stated previously, devices for extracting energy of the types previously described may be grouped together in multiples arranged in "farms" to furnish megawatts of power sufficient to meet the needs of an entire city. As an example, per the previously stated equations, one lineal mile of ocean wave front with eight foot crest to trough waves and with a period of ten seconds has one hundred eighty seven megawatts of power available. Furthermore, it should be appreciated that waves in both shallow and intermediate depth water near the shore contain the same amount of energy as those in deep ocean water if the wave height and period are the same in all places. Obviously, material and construction costs (or capital investment costs) should be less per kilowatt if the energy extraction apparatus is located near the shore. It will also be understood that the electricity generated by any of the devices described could be transmitted by cable to a power distribution center or could be transmitted directly to an electric motor or other device to operate the same.

The apparatae described and illustrate hereinabove are examples of simple devices adapted to extract the energy available from the motion of water beneath waves. These energy extraction devices operate on the principle of single or multiple moveable units having members or sails connected to an electrical power generating system. The devices described hereinafter have been developed to improve overall efficiency by introducing a secondary component (sail) and additional control systems, and will again be applicable to shallow, intermediate and deep water locations. For deep water applications, the secondary component would be located in tandem with the primary, affixed to a common structural floating frame, and allowed to articulate in the same manner as the primary (rectilinear or pivotal). The shallow water configuration could use the same common frame, or could be comprised of two separate, fixed, tandem installations with adjustable separation distance.

Both the power sail and the secondary sail in the devices hereinafter described have a pivotal motion, but it should be understood that the secondary sail concept is equally applicable to devices in which the sails have a rectilinear motion.

Disturbance of water on the leeward side represents available energy lost to the system. In FIG. 16, this is shown schematically wherein the extraction device may be a power member or sail of a type previously described. Since the extraction device must move to extract power and since water is assumed to be incompressible, water motion on the leeward side must occur unless the device is a perfect energy absorber. To deal with this reality, I have proposed multiple sails arranged in farms, i.e., a second extraction device which would convert energy not converted by the first extraction device, and so forth. To approach 100% efficiency, 'n' (i.e., 1, 2, 3,—n) sails would be required and material costs would be prohibitive. A simple alternative method to approach perfect efficiency will be apparent in the following.

As described hereinabove, the sail in a traveling wave interacts with water particles moving in a natural orbital motion. In nature, the incoming wave particle motion (windward) will be primarily orbital. In nature, another phenomenon exists and is described as a "standing wave". The water motion along a vertical breakwater wall is a common example of a standing wave. In theory, a breakwater wall reflects essentially all the energy seaward. The particle motion associated with a standing wave is quite different from that associated with a traveling wave and is depicted in FIG. 18. The visual surface contour appears the same as that for a traveling wave and is shown in solid line and also in dotted line one-half period later. The arrows indicate water particle movement. The vertical dot-dash lines 200 and 202 indicate respectively nodes and anti-nodes to be described more fully hereinafter.

FIG. 17 depicts the energy transfer and reflection scheme. In this figure, there is a power device which as stated above may be a sail of the type previously described, and a secondary device, which may also be a sail, spaced from the power device on the leeward side thereof. Since the secondary device may operate (as developed later) in several modes, all of which are designed to return energy in some manner, the device may be referred to generically as a reflector device. The ideal situation would be for the power device to move such that it accepts the incoming traveling wave energy with minimum reflection, but due to incompressibility conditions (its own motion), it must transmit some energy to the reflector device. The reflector device not only extracts some energy of its own accord, but returns some of the received energy back to the power device, where, if phased properly, this reflected energy increases the power output of the power device.

Proper phasing is a time-varying boundary condition problem and an exact solution is unlikely since the particle motion between the two devices makes a gradual transition from orbital (in the vicinity of the power device) to curvilinear (in the vicinity of the reflector device) as seen by the flattened circles 209, 211 and finally arrows 213 (representing curvilinear motion) in FIG. 19, referred to more fully hereinafter.

With further reference to FIG. 19, the water particles on the windward side of the power device (sail) 210 have orbital (or traveling-wave) motion and those on the lee side between the power sail 210 and the reflector device (sail) 212 transition toward standing-wave motion of the type shown in FIG. 18. The reflector sail has been placed on the leeward side of the power sail a distance $L/2$ therefrom, though it could be placed at $nL/2$ with $n=1, 2, 3,—$. The reason for this is apparent when one examines the particle motion in a pure standing wave (FIG. 18). The vertical motion at the nodes is zero and the motion is entirely horizontal. Thus, if a reflector is intended to be placed at a node, it would be at the position of maximum horizontal particle motion for a standing wave condition and thus could not satisfy the reflector's lee side condition of zero motion; these nodes occur at $L/4$, $\frac{3}{4}L$, etc. Conversely, at the anti-nodes, $nL/2$, the lateral motion is zero for a perfect reflector, indicated earlier as a requirement for no motion of water on the lee side of the reflector.

FIG. 19 depicts the "in phase" condition where the quasi-standing wave between the sails is in phase with the incident or traveling wave on the windward side of the power sail (note the surface contour of these waves) and the motion of the water in the quasi-standing wave would reinforce the motion of the power sail by reflecting the transmitted energy back to and in phase with the motion of the power sail. It may become advantageous to excite or move the reflector sail out of phase with the power sail to establish an optimum energy extracting condition. Although this condition, shown in FIG. 20, is contrary to nature, it is clear that if the quasi-standing wave between the power sail 204 and the reflector sail 206 is displaced 180° out of phase from the traveling wave, the power sail will be subject to maximum hydrostatic forces. It would, of course, become necessary to move the reflector sail so as to achieve this unnatural condition. Such movement of the reflector sail will desireably be of small amplitude since any movement of the reflector sail will generate wave motion on its leeside which represents transmitted or lost energy.

Due to the complex transition from traveling wave to quasi-standing wave in the presence of viscous damping and end effects, the system most likely will not be optimally "tuned" at displacements exactly equal to nL/2 nor at phase shifts exactly equal to zero or 180°. To allow for this variability and to attempt to avoid a resonant condition for the water between the two sails, the reflector sail will be permitted to move (either pivotally or rectilinearly as desired) and will be driven in consonance with either the motion of the power sail directly, or by a signal from a pressure transducer (to be described hereinafter). The description of these mechanisms and systems follows.

In servo mechanisms, it is possible to take a small amount of energy from a primary system and to use it for the purpose of positioning or driving a second system for enhancing the power out of the primary system via a feed-back loop.

FIG. 21 depicts an example of a simple purely mechanical system for achieving a 180° phase shift between the power sail wave and the reflector wave. Radius arms r1 and r2 extend from the axis of disc 221 (mounted in a suitable manner to rotate on a fixed axis) and are angularly spaced 180° apart about the rotational axis. A rod 224 is pivoted at its ends to arm r1 and power sail 226, and rod 228 is pivotal at its ends to arm r2 and reflector sail 232. Both sails may, of course, be operably connected to a power output device such as a generator or pump, with such connecting means capable of varying the connecting forces. Both sails may if desired be of rigid or flexible sheet type previously described and are disposed transversely of the direction of movement of the traveling wave. This arrangement provides a mechanical feed-back loop whereby the power sail 226, pivoted at its lower end at 234 so as to oscillate back and forth by the motion of the traveling wave, will oscillate the reflector sail 232, pivoted at its lower end at 236 on a parallel pivot axis. The motion of the reflector sail is however 180° out of phase with that of the power sail. Variations from 180° can be easily effected by angular variation of the radius arm attachment points. Inasmuch as the length of arm r2 will determine the amplitude of the waves of the lee side of the reflector sail, it should be as small as possible.

It is important to understand that the mass of water between the power and reflector sails will involve viscous dissipation of energy and while the spacing nL/2 is possible, the greater the 'n', the greater will be the energy losses in this direction; therefore L/2 is preferred, but other values are acceptable if geometry, site, or emplacement in the water is a critical cost factor.

If the water mass between the two sails is allowed to achieve a resonance condition with the incident wave form (wherein the incident wave energy couples with and strongly excites the motion of the water between) the efficiency of the system would be seriously degraded.

For viscous systems, the actual resonant frequency is always less than that for an undamped system and the resonant frequency is controlled by the damping factor, which in this case, is theoretically very complex. Thus, in practice the actual spacing of the sails will be imprecise and not necessarily nL/2. Also, the theory involves several time-varying boundary conditions which might require large-scale computer analysis for optimization which would, again, require further modifications of nL/2 when reduced to practice. The teachings herein are intended to indicate a nominal value for the distance between the sails, but not to limit it precisely to that value.

In nature, both the period and the wave length of a traveling wave will vary. These variations may result from changing wind conditions and storms at sea, occurring either locally or at some distance away. Devices may be designed to operate well for a particular locale as determined by historical records (which may necessitate some departure from the theoretical spacing between sails), but then operate at less than optimum efficiency as wave length and period change. It is desireable, therefore, to provide a means for changing the spacing between the power and reflector sails to compensate for gradual changes in wave period and length. Assume, for example a storm at sea creating waves of a longer period than at the locale of an energy device. The storm energy transferred by traveling waves will gradually reach the energy device at the locale and increase the local wave period. This usually takes a time interval (days) which is much longer than the wave period (seconds). Thus the wave period can be considered a slowly-varying function, and hence adequate time is available to adjust the distance between the power and reflector sails.

A position servo, controlled by inputs from a sensor which measures the local period, can be utilized to maintain an optimum separation by adjusting the distance between sails. The adjustment of this distance can be accomplished by standard mechanical positioning means such as a horizontal screw-jack or similar worm gear device in instances where one of the sails is guided for movement toward and away from the other. Other typical positioning means, such as a hydraulic positioning ram, can be used. The positioning device would be operated by using a small percentage of the power generated by the primary sail and would preferably be physically located overhead, i.e. not submerged.

A rather simple positioning device which works with the naturally occurring forces and forms a portion of this invention is shown in FIG. 22. A small carriage 250 supports reflector sail 251. A pivot 252 is shown supporting the sail, but the sail may be rigid with the carriage. The carriage is guided by means such as rail 253. Dogs C and D are pivoted on the carriage 250 and are normally held engaged, as by torsion springs on their pivots, with toothed racks A and B extending parallel with rail 253, to prevent the carriage from moving. Should the period of the incoming traveling wave (moving from left to right in FIG. 22) begin to change over some reasonable time (minutes), it is desireable to move the carriage to the right assuming the period is increasing and the power sail is to the left of the reflector sail. Similarly, the reflector should be moved to the left when the period is decreasing. FIG. 22 shows the device at two representative times, wave crest (t=0) and wave trough (t=T/2). It should be readily apparent from FIG. 22 that during the time interval from t=0 (wave crest) to t=T/4 (mean level) a flat plate 255 beneath pivot 252 will experience a greater pressure on the left side than on the right side. If the dogs are raised during the time interval t=−T/4 to t=T/4, (the entire crest duration) the carriage will move to the right at which time the dogs can be reengaged and the lateral separation between the two sails will be increased. Similarily, if the dogs are raised during the time interval T/4<t<3T/4 (the entire trough duration) the reflecting sail will move to the left. Since the wave motion is periodic regardless of amplitude, the forces are repetitive, and it is merely a matter of raising or lowering the dogs at the appropriate time.

Many means for raising and lowering the dogs at appropriate times should be available in the art. A suggested means is shown in FIG. 22 in which a motor 260, connected to dogs C and D by links 261 and 263 and operated for example by a position servo controlled by a sensor which measures local periods, will raise the dogs for an appropriate time interval. It should be noted that the lateral position shift desired may not require the dogs to be raised for a full half-period, but only a fraction of that time.

As is well known, the average water depth changes slowly with time due to tidal actions. This is relatively unimportant for the deep-water case, but of some importance for intermediate and shallow depths because $$L = \frac{gT^2}{2\pi} \tanh \frac{2\pi h}{L}$$

By inspection of this equation, one can observe that for a constant period, the wave length (L) is dependent on depth (h). For example, a wave energy device may be located in water of a depth of 10 meters where tides are ±1 meter, and thus for improved efficiency, the distance between the power and reflector sails should be adjusted or tuned for depth variation as well as period change. This tuning can be accomplished by a local pressure sensor which sends information to a microcomputer which processes the information not only for period, but also computes the slowly changing average depth. The micro-computer would then compute the appropriate L and nL/2 by solving the above equation modified to agree with reality gained by experience of application.

The technology of today allows for consideration of another unique feature of my invention to deal with the fact that in nature wave forms are more complex than the simple, sinusoidal form given by theory. Theory forms an excellent basis for the first order (monochromatic) explanations. However, open ocean waves are a complex combination of a great many periodic wave forms. It is well known by physicists and mathematicians that complex periodic wave forms can be represented by Fourier series, and that commercial computers (micro- and mini-types) are available and are capable of performing spectrum analysis of which Fourier series analysis is one example. Waves are periodic in nature, but the surface profile will vary from wave to wave. A pressure transducer, located an appropriate distance on the windward side of the power sail, can determine the surface profile (incident wave form) which can then be used to determine power available under increments of the wave form.

FIG. 23 shows a unique arrangement for an adaptive servo-system to perform this desired function. Of importance is the fact that the speed of the incoming traveling wave is much slower than the speed with which electrical signals are propagated. Therefore, the pressure transducer in FIG. 23 will have received its information long before the actual wave form (apparent to the transducer) arrives at the power sail. Thus, adequate time will be available for spectrum, depth and period analysis, which is necessary for optimization and computation. In general, the computations will be very rapid and time delay units will be necessary in the servo loop.

In FIG. 23, the power sail 260 is mounted on fixed pivot 262 to swing on an axis transverse, preferably at right angles, to the direction of movement of the traveling wave. The reflector sail 264 is pivoted to carriage 266 on an axis parallel to the pivot axis of the power sail. The carriage is supported on the lee side of power sail 260 on rail 267 for rectilinear movement toward and away from the power sail. Any suitable means, such as motor driven screwjack 268 may be provided to move the carriage. The spacing between sails will, of course, be approximately nL/2 adjusted for local conditions as determined by the pressure transducer and analyzers about to be described. A pressure transducer 270 located an appropriate distance on the windward side of the power sail is provided to determine the surface profile and feed information to the spectrum analyzer 272, depth analyzer 274, and period analyzer 276. These analyzers feed information to the computer 278 from which a signal to the motor-driven screw-jack 268 through a time delay unit 269 operates to move carriage 266 away from power sail 260 as when the traveling wave period (length) is increasing or to move the carriage toward the power sail when the traveling wave period (length) is decreasing.

In FIG. 23, both the power and the secondary sails may have power output devices such as generators or pumps or the like associated therewith to generate the power output resulting from the movement of the sails.

In the general case, the power output (power take off) device will incorporate some form of adaptive control system to vary the connecting (damping and restoring) forces automatically to compensate for variations in frequency and amplitude of the incident wave form. In the illustrated examples of FIG. 23 generators are provided, the field coils of which are diagrammatically shown at 280 and 281. Transducer signals processed by the analyzers are transmitted by the computers to alter the field coil strengths of these generators through time delay units 282 and 284 to extract maximum energy.

In FIG. 23, the simple mechanical phase shifter of FIG. 21 has been replaced by an adaptive control system. The phase shift may either be obtained by adjusting the separation distance by means such as 268, by individually turning either sail, (i.e. by adjusting the connecting forces), or by driving the reflector sail by a motor 281 located in the reflector sail unit.

In this sense, it is also contemplated that the secondary sail could have a drive motor associated with it in addition to a generator. The purpose of the motor would be to oscillate the reflector sail so as to achieve any desired phase shift between the motion of the water and the position of the sail. This motor will have the field coil 281. Transducer signals processed by the analyzers and computer would be transmitted to the field coil 281 to operate the motor and oscillate the reflector sail as necessary to produce the desired phase shift.

The FIG. 23 construction permits three principal modes of operation in an attempt to optimize the energy extracted from the incident wave. First, for well behaved (essentially monochromatic) seas, the motor-driven screw-jack or similar device would position the reflector sail in response to a signal from the transducer/analyzer system at a fixed optimized position at or near nL/2. The reflector sail could be rigid with respect to the carriage instead of moveable. This represents a simplistic case and simulates a rigid sea-wall reflector. Second, utilizing a generator system at the reflector sail and again positioning the sail at or near the optimized nL/2 position, the system would act as two tandem power devices both permitted to move independently and to be "tuned" independently (variable connecting forces) in pivotal (or rectilinear) motion. Both devices would incorporate one of many adaptive schemes to vary damping and restoring forces such as varying the field coil strengths in both generators. The whole adaptive control system could be computer-optimized to extract maximum energy. Third, utilizing a motor system for the reflector sail and again positioning the sail at or near the nL/2 position, the reflector sail would be driven by the motor in pivotal (or rectilinear) motion according to transducer signals processed by the analyzers in order to produce any desired phase shift. This represents the "active control" solution which might be required to maximize the energy extracted and be particularly effective in random or confused seas. The field coil strength in the power sail generator could, again, be computer-optimized to extract the maximum amount of energy from the incoming wave and reflected from the reflector sail. An alterative active control mode can be effected from FIG. 23 wherein a signal 285 proportional to the motion of the power sail is extracted from the generated power therefrom and routed through the computer for processing (e.g. amplification), attenuation, phasing, etc). This signal is then fed back through the appropriate time delay unit 284 to provide a drive for the secondary sail which is a direct feedback from the motion of the power sail.

While the figures depict the ocean floor as horizontal this condition is not necessary to my invention. In fact, an upward slope (windward to leeward) has some advantages as it would require a shorter nL/2 than that for a horizontal surface and thus, result in less material usage.

Finally, while I have described a single unit, it is clear that multiple units arranged in farms would be a logical extension. It should also be clear that the power sails shown in conjunction with secondary sails in FIGS. 16-23 are illustrated diagrammatically and may be of a suitable construction such as shown in any of the preceding figures.

The apparatus described and illustrated herein are examples of simple devices adapted to extract all available energy from the motion of water beneath waves. Other modes of applying the principles of the invention may be employed, provided features stated in any of the following claims or the equivalents thereof be employed.

I claim:

1. Apparatus for extracting energy from the motion of water beneath a traveling wave in a body of water comprising a power member capable of being moved by the water, means for supporting said power member in said body of water with at least a substantial portion thereof beneath the surface of the waves in a manner such that said power member can be moved back and forth by the movement of water beneath the waves, means operatively connecting said power member to a conversion device to transfer the energy extracted by said power member to said conversion device, a secondary member, and means supporting said secondary member in said body of water with at least a substantial portion thereof beneath the surface of the waves at the leeward side of said power member and spaced therefrom a distance such that it receives energy transmitted through said power member and returns some of the received energy back to said power member to work in conjunction with said power member as a unit.

2. Apparatus for extracting energy from the motion of water beneath a traveling wave in a body of water comprising a power member capable of being moved by the water, means for supporting said power member in said body of water with at least a substantial portion thereof beneath the surface of the waves in a manner such that said power member can be moved back and forth by the movement of water beneath the waves, means operatively connecting said power member to a conversion device to transfer the energy extracted by said power member to said conversion device, a secondary member, and means supporting said secondary member in said body of water with at least a substantial portion thereof beneath the surface of the waves at the leeward side of said power member and spaced therefrom a distance such that it receives energy transmitted through said power member and returns some of the received energy back to said power member to work in conjunction with said power member as a unit, including means for positioning of one of said supporting means relative to the other to vary the basic separation between said members.

3. Apparatus as defined in claim 2, wherein said positioning means comprises a worm gear device.

4. Apparatus as defined in claim 2, wherein said positioning means comprises a ram device.

5. Apparatus as defined in claim 2, wherein said positioning means comprises a dog and rack device.

6. Apparatus as defined in claim 2, wherein said secondary member is rigidly supported to reflect energy back toward said power member.

7. Apparatus as defined in claim 1 or 2, wherein said secondary member is supported by said second-mentioned supporting means in a manner to permit reciprocal movement thereof back and forth independently of said power member by the movement of water beneath the waves.

8. Apparatus as defined in claim 7, including means for operatively connecting said secondary member to a second conversion device to transfer the energy extracted by said secondary member to said second conversion device.

9. Apparatus as defined in claim 1 or 2, and adaptive control means as provided to vary the connecting forces applied to said power member by said connecting means.

10. Apparatus as defined in claim 9, including a signal means for determining the wave form in the vicinity of the power member, and producing, processing, and transmitting a signal based on said determination to operate said adaptive control means.

11. Apparatus as defined in claim 2, including signal means for determining the wave period and mean water depth, and producing, processing, and transmitting a signal based on said determination to said positioning means to operate the same.

12. Apparatus as defined in claim 1 or 2, including means for moving said secondary member back and forth in the direction of movement of the water particles of the wave.

13. Apparatus as defined in claim 12, wherein said means for moving said secondary member back and forth includes a servomechanism feedback system.

14. Apparatus as defined in claim 13, wherein said servomechanism feedback system includes a signal derived from the motion of said power member.

15. Apparatus as defined in claim 12, wherein said means for moving said secondary member back and forth includes a motor, and a signal means for determining the wave form in the vicinity of the power member, and producing, processing, and transmitting a signal based on said determination to said motor to operate the same.

16. Apparatus as defined in claim 15, wherein said signal means includes a pressure transducer and a signal spectrum analyzer.

17. Apparatus as defined in claim 15, wherein said second signal means includes a pressure transducer and depth and period analyzers.

18. A method of extracting energy from the motion of water beneath a traveling wave in a body of water comprising supporting a power member in said body of water with at lease a substantial portion thereof beneath the surface of the waves for back and forth movement by the water, operatively connecting said power member to a conversion device to transfer the energy extracted by said power member to said conversion device, and supporting a secondary member in said body of water with at least a substantial portion thereof beneath the surface of the waves at the leeward side of said power member and spaced therefrom a distance such that it receives energy transmitted through said power member and returns some of the received energy back to said power member to work in conjunction with said power member as a unit.

19. A method as defined in claim 18, wherein said secondary member is rigidly supported to reflect energy back toward said power member.

20. A method as defined in claim 18, wherein said secondary member is supported in a manner to permit reciprocal movement thereof back and forth by the movement of water beneath the waves.

21. A method as defined in claim 20, including operatively connecting said secondary member to a second conversion device.

22. A method as defined in claim 18, including varying the connecting forces applied to said power member by the operative connection thereof to said conversion device.

23. A method as defined in claim 21, including varying the connecting forces applied to said power and secondary members by the operative connections thereof to said respective conversion devices.

24. A method as defined in claim 22, including determining the wave form in the vicinity of the power member, and producing, processing, and transmitting a signal based on said determination to adapt thereto the aforesaid variation of connecting forces.

25. A method as defined in claim 18, including determining the wave period and mean water depth, producing, processing, and transmitting a signal based on said determination, and varying the spacing between said members in accordance with said second signal.

26. A method as defined in claim 18, including moving said secondary member back and forth in the direction of movement of the water particles of the wave.

27. A method as defined in claim 26, wherein the back and forth movement of said secondary member is dependent upon a signal derived from the motion of said power member.

28. A method as defined in claim 26, wherein the back and forth movement of said secondary member is dependent upon a signal derived from the wave form in the vicinity of said power member.

29. A method as defined in claim 26, wherein the spacing between said members is variable and dependent upon a signal derived from the wave period and mean water depth in the vicinity of said power member.

* * * * *